Patented Nov. 20, 1951

2,575,687

UNITED STATES PATENT OFFICE 2,575,687

HEAT, FLAME, AND FIRE RESISTANT SEALANTS

Eli Simon, Los Angeles, and Frank W. Thomas, Burbank, Calif., assignors to Lockheed Aircraft Corporation, Burbank, Calif.

No Drawing. Application November 19, 1948, Serial No. 61,145

11 Claims. (Cl. 260—30.4)

This invention relates to caulking and sealing materials and relates more particularly to materials of this character that are resistant to heat, flame and fire.

There are many situations where it is necessary, or at least desirable, to employ sealants or putties that are resistant to heat and fire. For example, it is becoming increasingly important in the manufacture and maintenance of aircraft to avoid the use of materials that constitute a potential hazard either in initiating a fire or in the propagation of fire. Accordingly, the caulking and sealing materials employed on hot air ducts, manifolds, carburetor ducts, firewalls, etc. in aircraft must be resistant to heat, flame and fire. In the case of caulking compounds used on bulkheads, firewalls, manifolds, etc. the materials must not only be heat resistant but must also be flame and fire resistant to form effective barriers for preventing the transference of fire from one zone to another. Another requirement of such materials intended for use in aircraft is that they must be able to withstand extraordinary temperature variations and considerable vibration and flexure without cracking and while maintaining unbroken adhesion to the surfaces to which they are applied. While we herein make reference to aircraft as a field of use for the heat, flame and fire resistant materials of the invention, it is to be understood that this is not intended to limit either the scope or application of the invention but is simply by way of example.

It is a general object of our invention to provide a putty, caulking material, or sealant that is heat, flame and fire resistant, that retains an effective adherence without cracking, peeling or cold flowing even under conditions of vibration and extensive temperature variation and that is resistant to and substantially unaffected by water, oil, liquid fuels and other fluids. The sealants resist intermittent temperatures as high as 800° F. and a continuously applied temperature of 600° F. without loss of adhesion and without injury. At elevated temperatures the materials of the invention remain somewhat elastomeric to retain their adhesion even during vibration and structural flexure and at temperatures as low as —60° F. there is no loss of adhesion. The adhesion, in fact, remains excellent at temperatures ranging from 800° F. to —60° F. regardless of the sectional thickness of the applied material and thermal shock does not adversely affect its adhesion. The cured materials do not propagate combustion and contain incombustible fillers which provide discontinuities which assist in limiting or preventing continued burning.

Another object of the invention is to provide sealants of the class referred to that are not subject to auto-ignition when the parts or structures to which they are applied are raised to high temperatures. Thus where a material of the invention is applied to a panel, or the like, and the panel is raised to a temperature of, say, 200° F. there is no auto-ignition of the material. This characteristic minimizes the possibility of the propagation of fire from one sealed off zone to another, thereby adapting the materials for use on firewalls and as caulking in situations where a hazardous fire area or zone is to be isolated or sealed off from an area to be protected.

A further and important object of the invention is to provide heat, flame and fire resistant sealing materials of the class referred to characterized by their ability to set or cure even in thick sections in a relatively short time at room temperatures. The initial cure or preliminary set is effected by solvent release in a very short time and results in a stiff matrix having good adhesion to the underlying surface. The sealant materials of the invention incorporate a silicone resin binder and so far as we are aware the previously developed and introduced putty-sealants employing such silicone resins have required days to produce any degree of solvent release owing to the lasting affinity of the silicone resins for the high boiling point solvents employed in the formulations. We have overcome this drawback, which renders the use of the prior silicone resins wholly impractical in heat and flame resistant putties and sealants, by using solvents that are liquid at room temperature and which having a boiling point in the range between 25 and 100° C. The use of such low boiling point solvents in our sealing material makes it possible for even thick layers or sections of the applied material to air-dry at room temperature in a few hours to form adherent masses or layers which then may be subjected to elevated temperatures without blistering or losing continuity and adhesion. As distinguished from this the subjection of the previously produced silicon resin coatings to elevated temperatures after a comparable period of initial setting results in blistering and cracking of the coating due to the extensive retention of the solvent.

A still further object of the invention is to provide a sealing compound of the above described character that has good package stability and that is easy and convenient to apply. By varying the solvent content the consistency of the material may be controlled or altered to adapt it for application by troweling, hand filleting, brushing or pressure injection.

The sealing material is compounded from one or more refractory fillers, a blend of thermo-setting and thermo-plastic silicone resins serving as a binder and primary material and one or more solvents having a high evaporation rate and low retention by the silicone resins.

The refractories or fillers, load or fill the material, prevent cold flowing, particularly when the material is applied in thick fillets and layers, form internal barriers or discontinuities for resisting sustained combustion of the applied material, and, in general, increase the heat, flame and fire resistance of the product. The fillers may include one or more of the following: vitreous fibers, fibrous and powdered silicates, powdered metal oxide and metal carbonates. The proportion of the refractory fillers employed in the sealant depends upon the intended use or application and, to some extent upon the desired consistency, etc. In practice the fillers are used in the proportion of from 25 to 200 parts (total) by weight for each 100 parts (total) by weight of the resins. The vitreous fibers and the fibrous silicates are used in the approximate proportion of from 25 to 175 parts (total) by weight to 100 parts (total) by weight of the resins, the powdered silicates and the powdered metal oxides are employed in the approximate proportion of from 1 to 50 parts (total) by weight to 100 parts (total) by weight of the resins and the metal carbonates are employed in the approximate proportion of from 1 to 50 parts (total) by weight to 100 parts (total) by weight of the resins.

It is to be understood that it is not essential to employ all of the above classes of refractory fillers in any given formulation and that various combinations of the fillers may be included as found most desirable. The vitreous fibers which we have found to be suitable for incorporation in the sealant includes Pyrex glass fibers (a sodium-potassium-borosilicate) which may have a fiber length of $\frac{1}{64}''$ to $1''$ and which have a softening point of from 1400° F. to 2000° F., silica glass fibers having a fiber length of $\frac{1}{64}''$ to $1''$ and a softening point of from 2000° F. to 3200° F., and rock wool. The fibrous silicates or asbestos may have a fiber length of from $\frac{1}{128}''$ to $2''$ while the powdered silicates may be magnesium silicate (2MgO.SiO$_2$) having a fusion point of 3434° F., aluminum silicate (3Al$_2$O$_3$.2SiO$_2$) having a fusion point of 3290° F., and/or potassium aluminum silicate (K$_2$O.Al$_2$O$_3$.2SiO$_2$) having a fusion point of 3254° F. The powdered metal oxides which have been found to be satisfactory for incorporation in the sealant compounds include:

Magnesium oxide (MgO)—fusion point, 5072° F.
Thorium oxide (ThO$_2$)—fusion point, 5486° F.
Cerium oxide (CeO$_2$)—fusion point 5090° F.
Zirconium oxide (ZrO$_2$)—fusion point, 4928° F.

The metal carbonates that we employ in our sealant formulations are magnesite, which occurs in nature as magnesium carbonate (MgCO$_3$) having a fusion point of approximately 5000° F. after the carbon dioxide is driven off, calcium carbonate (CaCO$_3$) having a fusion point of approximately 4658° F. and dolomite (CaMg(CO$_3$)$_2$) having a fusion point of approximately 4750° F.

The resins or binders of our sealant formulations are organo silicon-oxygen resins that are initially thermoplastic and soluble in aliphatic saturated and unsaturated cyclic compounds and that set or become heat-stabilized and solvent-resistant after exposure to elevated temperatures. We prefer to employ a blend or combination of a polysiloxane and a polysilsesquioxane, the polysiloxane being represented by

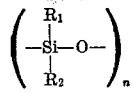

and the polysilsesquioxane being represented by

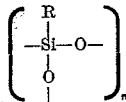

where R, R$_1$ and R$_2$ may be methyl, ethyl, propyl, phenyl or substituted phenyl groups and where $n$ may vary from 100 to 5000. A polysiloxane is formed by condensation of a silanediol, a bifunctional molecule, and yields a linear polymer that contributes elasticity and adhesion to the sealant and imparts flexibility thereto over an extensive temperature range. The formation of a polysiloxane may be represented by:

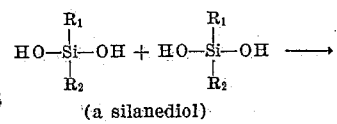

(a silanediol)

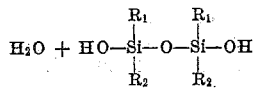

or gives a recurring unit

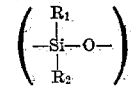

where R$_1$ and R$_2$ may be methyl, ethyl, propyl, phenyl or substituted phenyl groups.

A polysilsesquioxane is formed by condensation of a silanetriol, which is a tri-functional molecule, and yields highly cross-linked molecules contributing to the rapid curing, the hardness and the heat stability of the sealant of the invention. The formation of a polysilsesquioxane may be represented as follows:

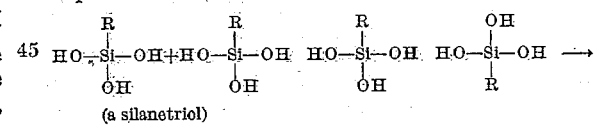

(a silanetriol)

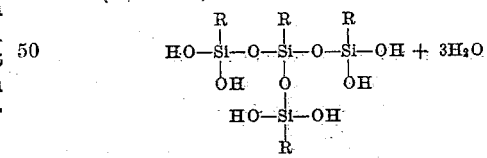

or a recurring unit of

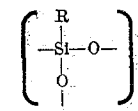

where —R— may be methyl, ethyl, propyl, phenyl or substituted phenyl groups.

The polysiloxanes that are practical and effective in our sealant formulations are:

polymeric methyl aryl silicone
polymeric dimethylsilicone
polymeric methyl chlorophenyl silicone
polymeric diethyl silicone The polysilsesquioxanes that are suitable for inclusion in the sealant of the invention are:

polymeric monomethyl silicone
polymeric monoethyl silicone
polymeric monophenyl silicone
polymeric chlorophenyl silicone The selected polysiloxane and polysilsesquioxane resins are employed in the sealant formulations of the invention in the proportion range of from 5 parts by weight of the polysiloxane to 1 part by weight of the polysilsesquioxane to 1 part by weight of the polysiloxane to 3 parts by weight of the polysilsesquioxane. It will be observed that the silicone resin blends or constituents of our formulations are composites of both a thermosetting resin and a thermoplastic resin.

In accordance with the invention, the solvents of the sealing compounds have a high evaporation rate and the characteristic of being quickly released by the silicone resins at relatively low temperatures. These properties of the solvents provide for the rapid curing of the sealant materials at room temperatures, say 80° F. even when the sealant materials are applied in thick sections or layers. The solvents which we employ are hydrophobic liquids and have a boiling point not greater than 100° C., the boiling points being between 25° C. and 100° C. Included in the solvents which we have found to be satisfactory are unsaturated cyclic compounds such as benzene, having a boiling point of 80° C. and furan having a boiling point of 30° C.; saturated cyclic compounds such as cyclopentane having a boiling point of 50° C., cyclohexane having a boiling point of 50° C., tetra hydrofurane having a boiling point of 64° C. and tetra hydropyran having a boiling point of 88° C.; saturated straight chain compounds such as pentane having a boiling point of 36.2° C., hexane having a boiling point of 69° C. and heptane having a boiling point of 98.4° C.; and unsaturated straight chain compounds such as amylene having a boiling point of 40° C., hexylene having a boiling point of 68° C. and heptane having a boiling point of 98° C. and chlorinated solvents such as carbon tetrachloride, having a boiling point of 76.7° C., chloroform having a boiling point of 61.2° C. and trichlorethylene having a boiling point of 87° C. It is to be understood that the above enumeration of solvents is not intended to restrict the invention to the employment of these particular solvents, it being apparent that other saturated and unsaturated straight chain and cyclic compounds that are liquid at room temperature and that have a boiling point not greater than 100° C., other than compounds such as hydrophilic esters, ketones, alcohols, ethers, aldehydes, etc., may be employed in the sealing material formulations of the invention. The solvent or a selected mixture of solvents is employed in the formulation in the proportion of from 10 to 100 parts by weight to 100 parts by weight (total) of the resins and fillers.

The following are typical examples of the sealant formulations of the invention:

Example 1

| | Percentage by weight |
|---|---|
| Polymeric methyl aryl silicone (a polysiloxane) | 32 |
| Polymeric monomethyl silicone (a polysilsesquioxane) | 8 |
| Asbestos, short fibers (1/128″–⅛″) | 32 |
| Asbestos, long fibers (⅛″–2″) | 8 |
| Cyclopentane | 20 |

The polymeric methyl aryl silicone is represented by the general formula:

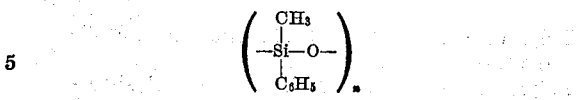

wherein $n$ represents from 100 to 5000.

The polymeric monomethyl silicone of Example 1 may be represented by the general formula:

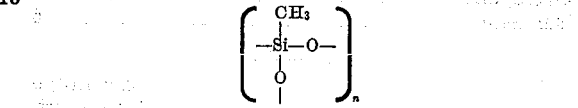

wherein $n$ represents from 100 to 5000.

Example 2

| | Percentage by weight |
|---|---|
| Polymeric methyl aryl silicone (a polysiloxane) | 32 |
| Polymeric monomethyl silicone (a polysilsesquioxane) | 8 |
| Asbestos, short fibers (1/128″–⅛″) | 32 |
| Pyrex fibers (1/64″–1″) | 8 |
| Cyclopentane | 20 |

Example 3

| | Percentage by weight |
|---|---|
| Polymeric methyl aryl silicone (a polysiloxane) | 32 |
| Polymeric monomethyl silicone (a polysilsesquioxane) | 8 |
| Silica short fibers (1/64″ to ⅛″) | 32 |
| Silica long fibers (⅛″–1″) | 8 |
| Cyclopentane | 20 |

Example 4

| | Percentage by weight |
|---|---|
| Polymeric methyl aryl silicone (a polysiloxane) | 30 |
| Polymeric monomethyl silicone (a polysilsesquioxane) | 10 |
| Asbestos short fibers (1/128″–⅛″) | 20 |
| Asbestos long fibers (⅛″ to 2″) | 10 |
| Magnesium oxide | 10 |
| Tetrahydrofurane | 20 |

Example 5

| | Percentage by weight |
|---|---|
| Polymeric dimethylsilicone (a polysiloxane) | 20 |
| Polymeric monoethyl silicone (a polysilsesquioxane) | 20 |
| Asbestos, short fibers (1/128″–⅛″) | 25 |
| Asbestos, long fibers (⅛″ to 2″) | 15 |
| Cyclopentane | 20 |

The polymeric dimethylsilicone of Example 5 is represented by the general formula:

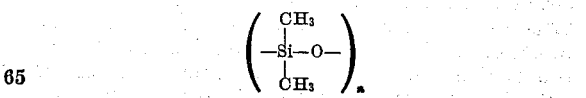

wherein $n$ represents from 100 to 5000. The polymeric monoethyl silicone of Example 5 is represented by the general formula:

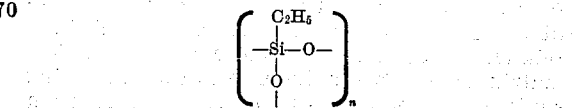

wherein $n$ represents from 100 to 5000.

Example 6

| | Percentage by weight |
|---|---|
| Polymeric methyl aryl silicone (a polysiloxane) | 24 |
| Polymeric monomethyl silicone (a polysilsesquioxane) | 8 |
| Asbestos, short fibers (1/128″–1/8″) | 22 |
| Asbestos, long fibers (1/8″–2″) | 6 |
| Cyclopentane | 35 |
| Benzene | 5 |

Example 7

| | Percentage by weight |
|---|---|
| Polymeric methyl chlorophenyl silicone (a polysiloxane) | 20 |
| Polymeric monophenyl silicone (a polysilsesquioxane) | 25 |
| Asbestos, short fibers (1/128″–1/8″) | 28 |
| Asbestos, long fibers (1/8″–2″) | 7 |
| Cyclopentane | 20 |

The polymeric methyl chlorophenyl silicone of Example 7 may be represented by the general formula:

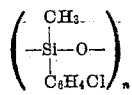

wherein $n$ may be from 100 to 5000. The polymeric monophenyl silicone of Example 7 may be represented by the formula:

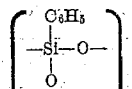

wherein $n$ may be from 100 to 5000.

Example 8

| | Percentage by weight |
|---|---|
| Polymeric diethyl silicone (a polysiloxane) | 30 |
| Polymeric monomethyl silicone (a polysilsesquioxane) | 10 |
| Asbestos, short fibers (1/128″–1/8″) | 40 |
| Cyclohexane | 20 |

The polymeric diethyl silicone of Example 8 may be represented by the following general formula:

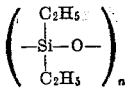

wherein $n$ may be from 100 to 5000.

In compounding or preparing the sealants, standard or conventional mixing techniques may be used. The consistency of the sealant may be controlled or varied to adapt the material for the specific purposes and modes of application by regulating the relative proportions of the solvent and solid matter constituents within the ranges specified above. The sealant may be applied by brushing, troweling, hand filleting or by pressure injection and is preferably applied directly to the surfaces or parts to be sealed. Excellent adhesion is obtained and retained on aluminum, steel, and other metals as well as on wood, etc. An initial set is obtained through solvent release even where the sealant is applied as a thick layer or coating, the initial set being effected at ordinary room temperatures of, say, 80° F. in a relatively short time to produce a stiff, tack free matrix having good adherence to the underlying surface. In practice, an overnight cure or a cure of about 12 hours is all that is required to release the solvent constituent and leave the stiff adhering matrix. Then, if desired, a cure to thermoset the material may be carried out. For this cure the material may be subjected to a temperature of from 250° F. to 600° F. the time of the cure being a function of the temperature. In other cases the usual or normal operating temperature of the ducts, manifolds, or the like, to which the sealant is applied, may serve to finally thermoset the material. Thus the equipment or part to which the sealant is applied may be put into operation after a short period, required for the solvent release, without danger of blistering, cracking or detachment of the sealant.

It should be understood that the invention is not based upon or dependent upon the theories which we have expressed. Nor is the invention to be regarded as limited to the express procedure or materials set forth, these details being given only by way of illustration and to aid in clarifying the invention. We do not regard such specific details as essential to the invention except insofar as they are expressed by way of limitation in the following claims in which it is our intention to claim all novelty inherent in the invention as broadly as is permissible in view of the prior art.

We claim:

1. A heat, flame and fire resistant sealant comprising on an approximate percentage by weight basis, 32 percent polymeric methyl aryl siloxane, 8 percent polymeric monomethyl silsesquioxane, 40 percent refractory silicate filler, and 20 percent cyclopentane.

2. A heat, flame and fire resistant sealant comprising on an approximate percentage by weight basis, 30 percent polymeric methyl aryl siloxane, 10 percent polymeric monomethyl silsesquioxane, 30 percent asbestos, 10 percent magnesium oxide and 20 percent tetrahydrofurane.

3. A heat, flame and fire resistant sealant comprising on an approximate percentage by weight basis, 20 percent polymeric dimethyl siloxane, 20 percent polymeric monoethyl silsesquioxane, 40 percent asbestos filler and 20 percent cyclopentane.

4. A heat, flame and fire resistant sealant comprising on an approximate weight basis, 20 percent polymeric methyl chlorophenyl siloxane, 25 percent polymeric monophenyl silsesquioxane, 35 percent asbestos filler, and 20 percent cyclopentane.

5. A heat, flame and fire resistant sealant comprising on an approximate weight basis, 30 percent polymeric diethyl siloxane, 10 percent polymeric monomethyl silsesquioxane, 40 percent asbestos, and 20 percent cyclohexane.

6. A heat, flame and fire resistant sealant comprising a resin blend of polymeric dimethyl siloxane and polymeric monoethyl silsesquioxane in the proportion range of from 5 parts by weight of the polymeric dimethyl siloxane to 1 part by weight of the polymeric monoethyl silsesquioxane, to 1 part by weight of the polymeric dimethyl siloxane to 3 parts by weight of the polymeric monoethyl silsesquioxane; from 25 to 200 parts by weight of refractory filler for each 100 parts by weight of said resin blend; and from 10 to 100 parts by weight of cyclopentane for each 100 parts of the aggregate weight of said resin blend and filler.

7. A heat, flame and fire resistant sealant comprising polysiloxane and polysilsesquioxane resins in the proportion range of from 5 parts by weight of a polysiloxane to 1 part by weight of a polysilsesquioxane, to 1 part by weight of the polysiloxane to 3 parts by weight of the polysilsesquioxane; the polysiloxane being selected from the group consisting of:

polymeric methyl aryl siloxane
polymeric dimethylsiloxane
polymeric methyl chlorophenyl siloxane
polymeric diethyl siloxane, the polysilsesquioxane being selected from the group consisting of:

polymeric monoethyl silsesquioxane
polymeric monomethyl silsesquioxane
polymeric monophenyl silsesquioxane
polymeric chlorophenyl silsesquioxane;

from 25 to 200 parts by weight of refractory filler for each 100 parts by weight of the aggregate weight of said resins; and from 10 to 100 parts by weight of a saturated cyclic compound selected from the group consisting of:

cyclopentane
cyclohexane
tetra hydrofurane
tetra hydropyran for each 100 parts of the aggregate weight of said resins and filler.

8. A heat, flame and fire resistant sealant comprising polysiloxane and polysilsesquioxane resins in the proportion range of from 5 parts by weight of a polysiloxane to 1 part by weight of a polysilsesquioxane, to 1 part by weight of the polysiloxane to 3 parts by weight of the polysilsesquioxane; the polysiloxane being selected from the group consisting of:

polymeric methyl aryl siloxane
polymeric dimethylsiloxane
polymeric methyl chlorophenyl siloxane
polymeric diethyl siloxane, the polysilsesquioxane being selected from the group consisting of:

polymeric monoethyl silsesquioxane
polymeric monomethyl silsesquioxane
polymeric monophenyl silsesquioxane
polymeric chlorophenyl silsesquioxane;

from 25 to 200 parts by weight of a refractory filler for each 100 parts by weight of the aggregate weight of said resins; and from 10 to 100 parts by weight of cyclopentane for each 100 parts by weight of the aggregate weight of said resins and filler.

9. A heat, flame and fire resistant sealant comprising polysiloxane and polysilsesquioxane resins in the proportion range of from 5 parts by weight of a polysiloxane to 1 part by weight of a polysilsesquioxane, to 1 part by weight of the polysiloxane to 3 parts by weight of the polysilsesquioxane; the polysiloxane being selected from the group consisting of:

polymeric methyl aryl siloxane
polymeric dimethylsiloxane
polymeric methyl chlorophenyl siloxane
polymeric diethyl siloxane, the polysilsesquioxane being selected from the group consisting of:

polymeric monoethyl silsesquioxane
polymeric monomethyl silsesquioxane
polymeric monophenyl silsesquioxane
polymeric chlorophenyl silsesquioxane;

from 25 to 200 parts by weight of filler for each 100 parts by weight of the aggregate weight of said resins, said filler comprising from approximately 25 to approximately 175 parts by weight of refractory fibrous material for each 100 parts by weight of the aggregate weight of said resins and from approximately 1 to approximately 50 parts by weight for each 100 parts by weight of the aggregate weight of said resins of metal carbonates selected from the group consisting of:

magnesite
calcium carbonate
dolomite;

and from 10 to 100 parts by weight for each 100 parts by weight of the aggregate weight of said resins, fibrous material and metal carbonates of a saturated cyclic compound selected from the group consisting of:

cyclopentane
cyclohexane
tetra hydrofurane
tetra hydropyran.

10. A heat, flame and fire resistant sealant comprising polysiloxane and polysilsesquioxane resins in the proportion range of from 5 parts by weight of a polysiloxane to 1 part by weight of a polysilsesquioxane, to 1 part by weight of the polysiloxane to 3 parts by weight of the polysilsesquioxane; the polysiloxane being selected from the group consisting of:

polymeric methyl aryl siloxane
polymeric dimethylsiloxane
polymeric methyl chlorophenyl siloxane
polymeric diethyl siloxane, the polysilsesquioxane being selected from the group consisting of:

polymeric monoethyl silsesquioxane
polymeric monomethyl silsesquioxane
polymeric monophenyl silsesquioxane
polymeric chlorophenyl silsesquioxane from 25 to 200 parts by weight of fillers for each 100 parts by weight of the aggregate weight of said resins, said fillers comprising from approximately 25 to approximately 175 parts by weight of refractory fibrous material for each 100 parts by weight of the aggregate weight of said resins and from approximately 1 to approximately 50 parts by weight for each 100 parts by weight of the aggregate weight of said resins of powdered metal oxides and silicates having fusion points ranging between 4658° F. and 5486° F., and from 10 to 100 parts by weight of a saturated cyclic compound selected from the group consisting of:

cyclopentane
cyclohexane
tetra hydrofurane
tetra hydropyran for each 100 parts by weight of the aggregate weight of said resins, fibrous and powdered materials.

11. A heat, flame and fire resistant sealant comprising polysiloxane and polysilsesquioxane resins in the proportion range of from 5 parts by weight of a polysiloxane to 1 part by weight of a polysilsesquioxane, to 1 part by weight of the polysiloxane to 3 parts by weight of the polysilsesquioxane; the polysiloxane being selected from the group consisting of:

polymeric methyl aryl siloxane
polymeric dimethylsiloxane
polymeric methyl chlorophenyl siloxane
polymeric diethyl siloxane, the polysilsesquioxane being selected from the group consisting of:

polymeric monoethyl silsesquioxane
polymeric monomethyl silsesquioxane
polymeric monophenyl silsesquioxane
polymeric chlorophenyl silsesquioxane;

from 25 to 200 parts by weight of filler for each 100 parts by weight of the aggregate weight of said resins, said filler comprising from 25 to 175 parts by weight of fibrous refractories for each 100 parts by weight of the aggregate weight of said resins, from 1 to 50 parts by weight of powdered silicates for each 100 parts by weight of the aggregate weight of said resins, and from 1 to 50 parts by weight of at least one metal carbonate selected from the group consisting of magnesite, calcium carbonate, and dolomite, and from 10 to 100 parts by weight for each 100 parts by weight of the aggregate weight of said resins and filler of a saturated cyclic compound selected from the group consisting of:

cyclopentane
cyclohexane
tetra hydrofurane
tetra hydropyran.

ELI SIMON.
FRANK W. THOMAS.

REFERENCES CITED

The following references are of record in the file of this patent:

UNITED STATES PATENTS

| Number | Name | Date |
|---|---|---|
| 2,258,218 | Rochow | Oct. 7, 1941 |
| 2,389,491 | Dunlap et al. | Nov. 20, 1945 |
| 2,428,608 | Bass | Oct. 7, 1947 |